United States Patent
Janton

(10) Patent No.: US 9,254,959 B2
(45) Date of Patent: Feb. 9, 2016

(54) STORAGE RACK

(75) Inventor: Peter Janton, Heilbronn (DE)

(73) Assignee: Hänel & Co., Altstätten (CH)

(*) Notice: Subject to any disclaimer, the term of this patent is extended or adjusted under 35 U.S.C. 154(b) by 0 days.

(21) Appl. No.: 12/516,286

(22) PCT Filed: Jan. 29, 2008

(86) PCT No.: PCT/EP2008/051054
§ 371 (c)(1),
(2), (4) Date: Jun. 9, 2009

(87) PCT Pub. No.: WO2008/092865
PCT Pub. Date: Aug. 7, 2008

(65) Prior Publication Data
US 2010/0070071 A1 Mar. 18, 2010

(30) Foreign Application Priority Data
Jan. 31, 2007 (DE) .......................... 10 2007 004 866

(51) Int. Cl.
*F21V 33/00* (2006.01)
*B65G 1/137* (2006.01)

(52) U.S. Cl.
CPC .............. *B65G 1/1373* (2013.01); *B65G 1/137* (2013.01); *B65G 2209/04* (2013.01)

(58) Field of Classification Search
CPC ................ F21V 33/00; F21V 33/0048; F21W 2131/301
USPC ................................................. 362/133, 234
See application file for complete search history.

(56) References Cited

U.S. PATENT DOCUMENTS

| | | | |
|---|---|---|---|
| 5,002,449 A * | 3/1991 | Kita et al. | 414/273 |
| 5,135,344 A * | 8/1992 | Kita et al. | 414/273 |
| 5,286,157 A * | 2/1994 | Vainio et al. | 414/273 |
| 5,328,316 A * | 7/1994 | Hoffmann | 414/280 |
| 6,024,425 A * | 2/2000 | Imai et al. | 312/35 |
| 6,224,313 B1 * | 5/2001 | Fukushima et al. | 414/280 |

(Continued)

FOREIGN PATENT DOCUMENTS

| | | |
|---|---|---|
| DE | 3401493 A1 | 7/1985 |
| DE | 3809520 C1 | 10/1989 |

(Continued)

OTHER PUBLICATIONS

International Search Report, dated Apr. 18, 2008 (2 pages).

*Primary Examiner* — Robert May
*Assistant Examiner* — Bryon T Gyllstrom
(74) *Attorney, Agent, or Firm* — Thomas B. Ryan; Harter Secrest & Emery LLP

(57) ABSTRACT

A storage rack has a plurality of supporting brackets arranged one above the other for supporting storage product carriers conveyable by means of an automatic filling and withdrawal apparatus, and at least one filling and withdrawal opening for inserting and removing the storage product carriers. At a top side of the filling and withdrawal opening, an indicating means is arranged for indicating storage locations of a storage product in the storage product carrier, wherein the indicating means has a plurality of discrete lighting elements. The lighting elements are arranged in a two-dimensional grid in such a way that a light beam of the lighting elements is essentially vertically directed onto a storage surface of the storage product carrier.

19 Claims, 3 Drawing Sheets

(56) References Cited

U.S. PATENT DOCUMENTS

| | | | |
|---|---|---|---|
| 6,680,200 B2* | 1/2004 | Everett | 435/420 |
| 6,878,896 B2* | 4/2005 | Braginsky et al. | 209/583 |
| 6,908,214 B2* | 6/2005 | Luk | 362/249.02 |
| 6,923,612 B2* | 8/2005 | Hansl | 414/277 |
| 6,929,440 B1* | 8/2005 | Grond | 414/284 |
| 7,128,521 B2* | 10/2006 | Hansl | 414/807 |
| 7,131,746 B2* | 11/2006 | Cook | 362/133 |
| 7,160,717 B2* | 1/2007 | Everett | 435/286.2 |
| 2004/0016684 A1* | 1/2004 | Braginsky et al. | 209/702 |
| 2005/0057941 A1* | 3/2005 | Pederson et al. | 362/542 |
| 2006/0051190 A1* | 3/2006 | Taguchi | 414/279 |
| 2007/0296596 A1* | 12/2007 | Moore | 340/572.7 |
| 2009/0129902 A1* | 5/2009 | Schafer | 414/274 |

FOREIGN PATENT DOCUMENTS

| | | |
|---|---|---|
| DE | 4302711 A1 | 8/1994 |
| DE | 102005061097 A1 | 1/2007 |
| EP | 1038804 A1 | 9/2000 |
| JP | H03128820 A | 5/1991 |
| JP | H072312 U | 1/1995 |
| JP | 2006269199 A | 10/2006 |

* cited by examiner

STORAGE RACK

CROSS-REFERENCE TO RELATED APPLICATIONS

The present application is a National Stage application of PCT/EP2008/051054 filed Jan. 29, 2008, which claims priority to German Application No. DE102007004866.3 filed Jan. 31, 2007, hereby expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to a storage rack comprising a plurality of supporting brackets stacked one above the other for supporting storage product carriers conveyable by means of an automatic filling and withdrawal apparatus comprising at least one filling and withdrawal opening for inserting and removing the storage product carriers, and having an indicating means arranged at a top of the filling and withdrawal opening for indicating storage locations of a storage product in the storage product carrier, wherein the indicating means comprises a plurality of discrete lighting elements.

In such storage racks, wherein diverse storage products are stocked, for filling or withdrawal of storage products, one storage product carrier is displaced into the filling and withdrawal opening. This filling and withdrawal opening is accessible to the operator. As soon as the storage product carrier is ready in the filling and withdrawal opening, the operator can place new storage products on the storage product carrier or remove them from the storage product carrier.

Modern storage racks of the initially mentioned type have a control which serves for inventory management and has a memory for memorizing which storage product is stocked in which storage product carrier. This is how the desired storage product carrier can be found by the operator. For quick and efficient finding of the desired storage product in a storage product carrier, it is known according to the prior art to mark the storage location of a storage product by means of a light marking.

2. Description of Related Art

DE 43 02 711 A1 discloses for this purpose a moveable light beam guide with which the storage product can be indicated. The light beam guide can be configured as a laser, the beam of which can be redirected by a pivotable mirror and guided to the desired location. Further it is disclosed to realize the light beam guide by means of a conventional light source having its light focused.

EP 1 038 804 A1 describes an indicating apparatus on a storage rack, the storage product carriers of which are subdivided into storage product rows. As soon as the storage product carrier is displaced into the filling and withdrawal opening, one of the storage product rows is optically marked by means of a light strip arranged at the side of the storage product carrier. The light source used in the light strip can be an LED, in particular.

Moreover, DE 38 09 520 C1 teaches an indicating means for a computer-controlled paternoster storage wherein a plurality of lighting elements are arranged above the filling and withdrawal opening, which can mark possible storage locations in a storage product carrier displaced into the filling and withdrawal opening.

BRIEF SUMMARY OF THE INVENTION

In view of this, it is the object of the present invention to suggest a storage rack of the initially mentioned type, wherein the reliability of the indication of storage locations is increased.

To solve this problem, it is suggested for a storage rack of the initially mentioned type, to arrange the lighting elements in a two-dimensional grid in such a way that a light beam of the lighting elements is oriented essentially vertical to a storage surface of the storage product carrier.

The storage rack of the present invention has the advantage that, due to the essentially vertical light beam, the radiation of the lighting elements cannot be blocked by storage products, in particular storage products of considerable size. This is how a reliable, unobstructed indication of the storage locations becomes possible.

Another advantage of the storage rack according to the present invention is that it can be simply and therefore cheaply manufactured because of the omission of expensive and complex components, such as lasers, redirecting units and optics.

Advantageous embodiments are the subject matter of the subclaims.

In an advantageous embodiment, the lamps of the lighting elements are configured as light-emitting diodes. This is advantageous in that the indicating means can be operated in a maintenance-free manner, and has a substantially lower power consumption compared to other light sources, such as incandescent lamps.

Advantageously, the lighting elements have a cylindrical section for limiting the solid angle area of the light beam. For this reason the lighting elements only require a small structural space, since no further means for focusing and/or directing the radiation are required.

In an advantageous embodiment, the lamps have a lens section. This makes it possible to further focus the radiation and to make the light marking clearly visible.

Further, the lighting elements can advantageously each comprise at least one mounting flange, with which they can be cheaply and simply mounted on the storage rack.

Further, it can be advantageously provided that the storage rack has a control device which drives the lighting elements according to the input of an operator.

It is particularly advantageous if an operating unit is connected to the control device for requesting storage products. This is to ensure efficient and simple operation of the storage rack.

BRIEF DESCRIPTION OF THE SEVERAL VIEWS OF THE DRAWING(S)

The invention will be explained in more detail in the following with reference to an exemplary embodiment, which is schematically shown in the drawings, wherein.

DETAILED DESCRIPTION OF THE INVENTION

Figure 1:
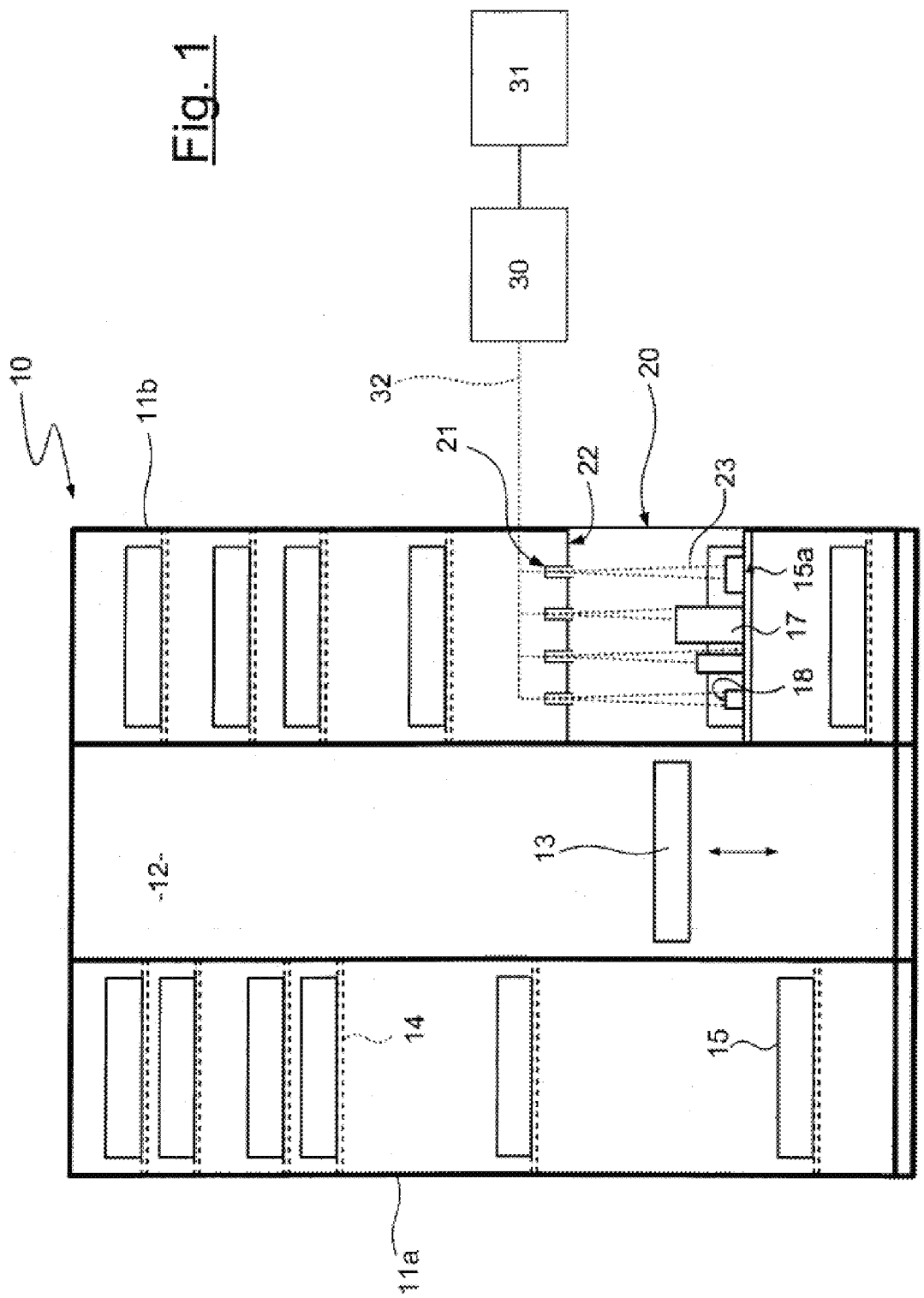
FIG. 1 is a schematic side view of an embodiment of a storage rack according to the present invention.

Storage rack 10 shown in FIG. 1 has two modules 11a, 11b spaced with respect to each other. Between modules 11a, 11b, a conveying space 12 is provided, in which a displaceable automatic filling and withdrawal apparatus 13 is arranged, with the aid of which storage product carriers 15 are conveyable.

Modules 11a, 11b have a plurality of spaced supporting brackets 14 arranged in pairs, which are arranged on opposite side walls 19a, 19b. Supporting brackets 14 are for supporting tray-like storage product carriers 15, in which storage products 17 are received.

A filling and withdrawal opening 20 is provided on module 11b, via which storage product carriers 15 can be inserted and removed.

Figure 2:
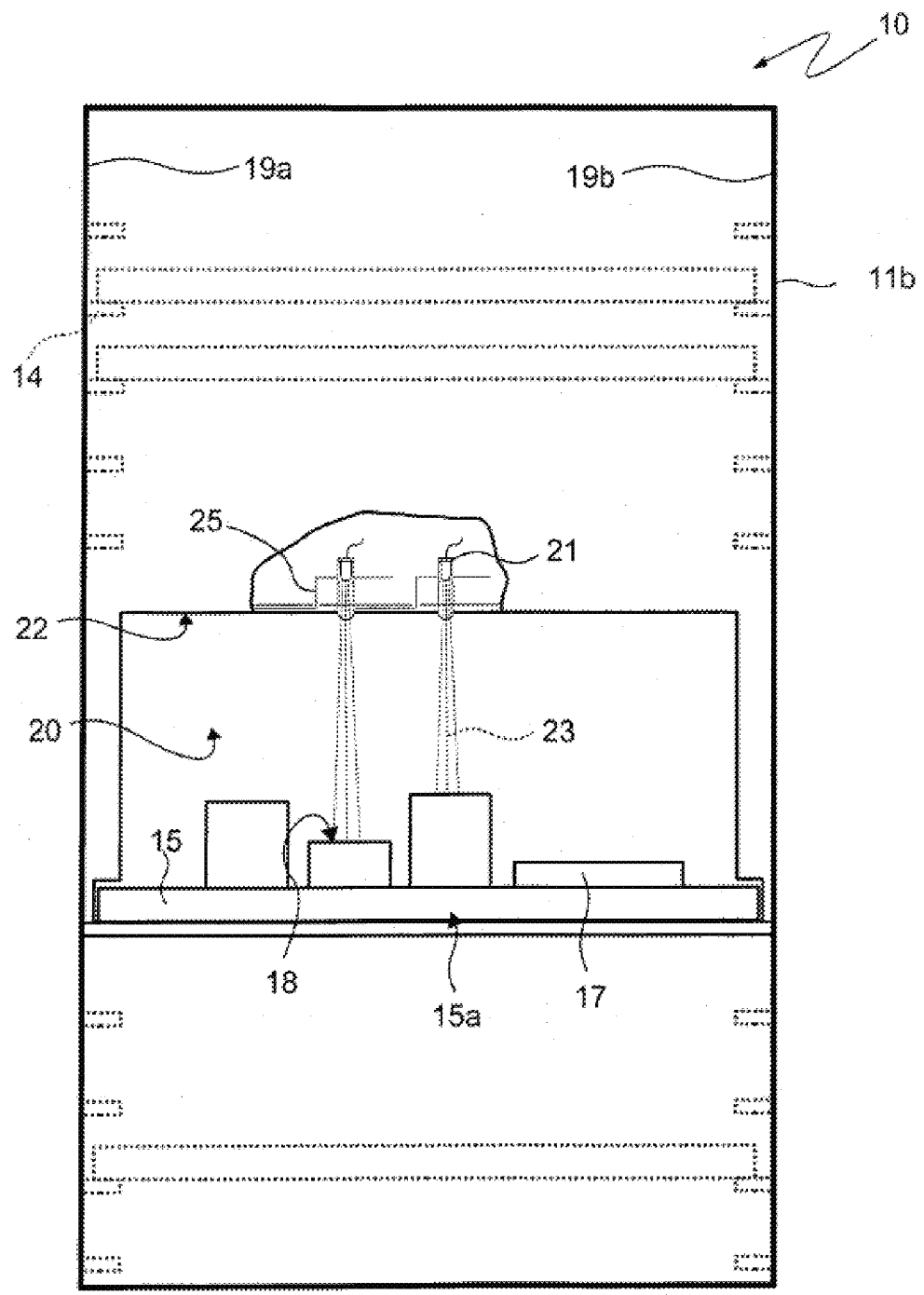
FIG. 2 is a schematic front view of the storage rack according to FIG. 1.

As can be seen from FIG. 2, an indicating means 16 is arranged at or in the top 22 of the filling and withdrawal opening 20, comprising a plurality of lighting elements 21. If a lighting element 21 is switched on, it emits a light beam 23. Light beam 23 is directed downwards onto storage product carrier 15, in particular onto storage locations for storage products 17.

Lighting elements 21 are arranged at or in the top 22 in such a way that light beam 23 produced by them impinges essentially vertically on a storage surface 15a on storage product carrier 15. This is to avoid a light beam 23 directed on a storage location being obstructed by storage product 17 stored in an adjacent storage location.

A light marking 18 is created on storage product 17 by light beam 23 of lighting element 21 to make storage product 17 clearly visible to the operator.

Figure 3:
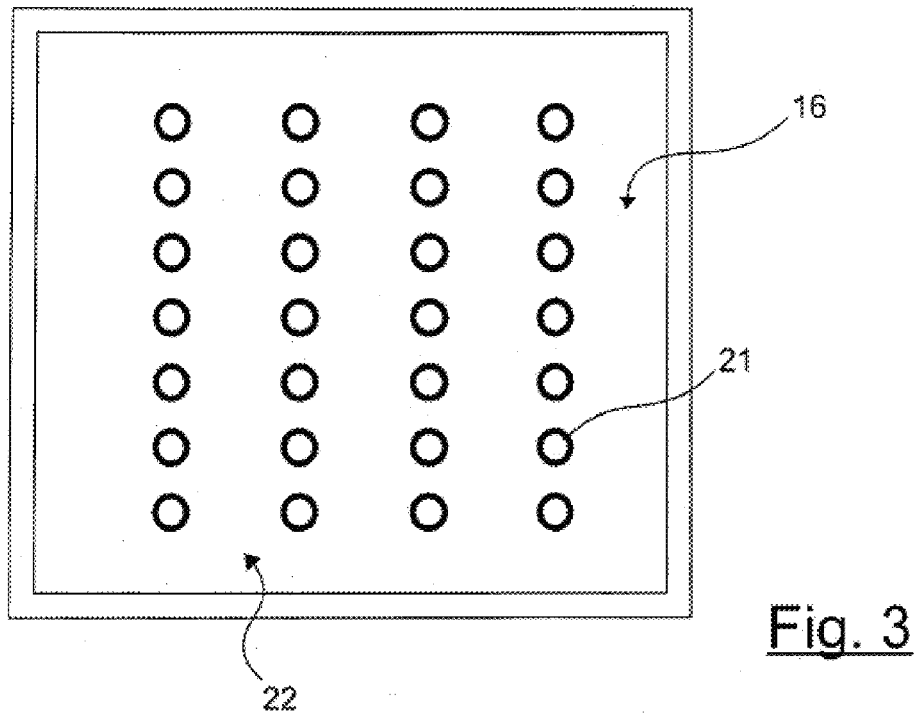
FIG. 3 is a plan view of an indicating means according to the present invention.

As can be seen from FIG. 3, lighting elements 21 are arranged in a two-dimensional grid.

The use of other grids adapted to the geometry of certain storage products 17 is also possible.

To drive lighting elements 21, a control device 30 is provided. An operating unit 31 is connected to a control device 30 making it possible to select a certain storage product 17. After input of a desired storage product 17, the control device 30 drives the filling and withdrawal apparatus 13 in such a way that the corresponding storage product carrier 15 is traversed into filling and withdrawal opening 20. As soon as the storage product carrier 15 is present within the filling and withdrawal opening 20, that lighting element 21 is driven which creates a light marking 18 on the storage location of the desired storage product 17.

Figure 4:
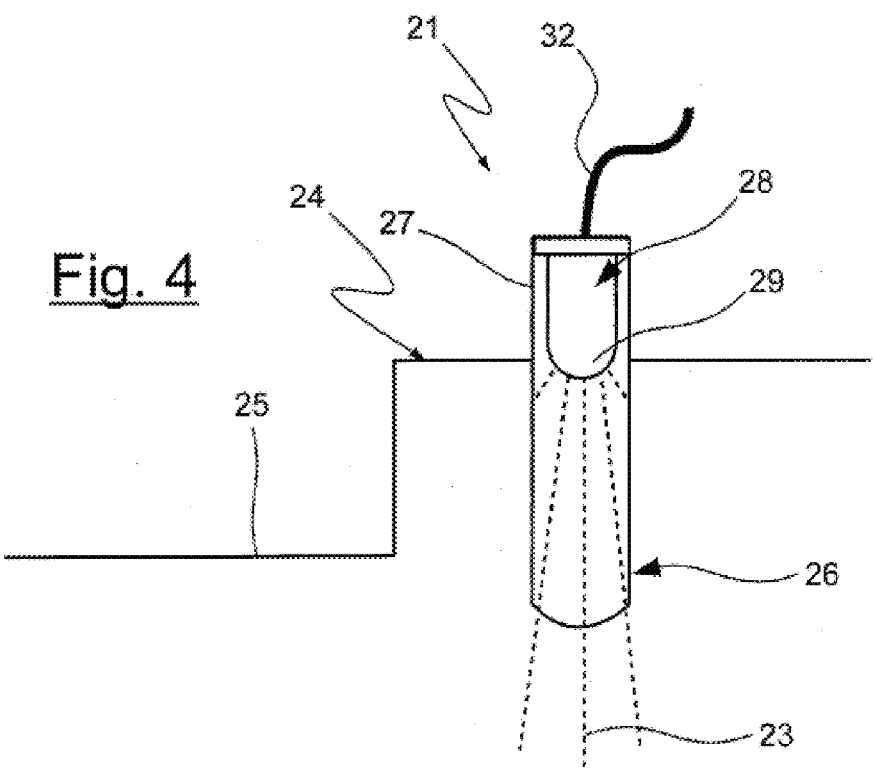
FIG. 4 is an enlarged view of a lighting element with a light-emitting diode and mounting means of the indicating means according to FIG. 3.

The structure of a lighting element 21 is shown in FIG. 4. A housing 24 has a mounting flange 25 with which the lighting element 21 is mounted on the top 22 of filling and withdrawal opening 20. Further, housing 24 has a cylindrical section 26 open at the bottom. Mounting flange 25 and cylindrical section 26 can each be of metal or plastic material.

At the top 27 of cylindrical section 26, a light-emitting diode (LED) 28 is arranged as a lamp, the main radiating direction of which is directed toward the open end of cylindrical section 26. Light-emitting diode 28 has a lens section 29 through which the light radiated by light-emitting diode 28 is focused. The length of cylindrical section 26 additionally has a directing effect on light beam 23. This is to ensure that only a locally limited area of storage product carrier 15 is illuminated by lighting element 21.

Lighting element 21 has a control connection 32 at the top end 27 of cylindrical section 26, through which it is supplied with electrical energy and connected to control device 30.

As shown in FIG. 2, lighting element 21 is mounted at the top 22 of filling and withdrawal opening 20 by means of a mounting flange 25.

The present invention is characterized, in particular, in that an unobstructed indication of storage locations is possible and in that lighting elements 21 used for this purpose can be simply and cheaply manufactured. Further, lighting elements 21 can be cheaply and reliably attached at the top 22 of filling and withdrawal opening 20 by means of their mounting flange 25. The lighting element 21 advantageously equipped with the light-emitting diode 28 has the additional advantage of low power consumption and of being practically maintenance-free over the entire useful life of the storage rack 10.

The invention claimed is:

1. A storage rack comprising:
   a plurality of tray-like storage product carriers each containing a plurality of storage locations for storing products;
   a storage module including a plurality of supporting brackets arranged on opposite side walls of the storage module one above the other defining a plurality of vertically displaced storage spaces, each for supporting one of the tray-like storage product carriers;
   a filling and withdrawal opening in a front wall of the storage rack through which each of the storage product carriers can be inserted into and removed from the storage rack, the opening being positioned between the opposite side walls and vertically beneath one or more of the storage spaces in the storage module;
   the filling and withdrawal opening being accessible to an operator so that the operator can place storage products in the storage locations of the storage product carriers and remove the storage products from the storage product carriers when individual storage product carriers are located within the filling and withdrawal opening;
   an automatic filling and withdrawal apparatus configured to selectively convey (a) the storage product carriers inserted in the filling and withdrawal opening to any one of the storage spaces and (b) the storage product carriers stored in any one of the storage spaces to the filling and withdrawal opening;
   the automatic filling and withdrawal apparatus being arranged to convey the storage product carriers in a vertical direction between the filling and withdrawal opening and the storage spaces within a conveying space adjacent to the storage module and the filling and withdrawal opening in the storage module;
   a plurality of discrete lighting elements located inside the storage module, behind the front wall of the storage rack and between the opposite side walls of the storage module in a position proximate a top of the filling and withdrawal opening and vertically beneath one or more of the plurality of storage spaces;
   the plurality of discrete lighting elements arranged in a two-dimensional grid, each of the discrete lighting elements generating a light beam that is essentially vertically directed from the respective lighting element onto a different locally limited area on a storage surface of one of the storage product carriers disposed in the filling and withdrawal opening; and
   a control device controlling the discrete lighting elements to selectively illuminate fewer than all of the discrete lighting elements to selectively illuminate one or more of the different locally limited areas on the storage surface to create a light marking on the storage surface that distinguishes one or more of the storage locations on the surface of the storage product carrier in the filling and withdrawal opening from other storage locations on the surface of the storage product carrier.

2. The storage rack of claim 1, wherein the lighting elements are light-emitting diodes.

3. The storage rack of claim 1, wherein each of the lighting elements has a cylindrical section for limiting a solid angle area of the light beam.

4. The storage rack of claim 1, wherein each of the lighting elements has a lens section.

5. The storage rack of claim 1, wherein each of the lighting elements has a mounting flange.

6. The storage rack of claim 1, further comprising an operating unit for requesting a storage product carrier from the storage rack.

7. A storage system for retaining a plurality of storage product carriers, each containing a plurality of storage locations for storing products comprising:
- a storage rack including (a) a storage module having a plurality of supporting brackets on opposite side walls of the storage module defining vertically displaced storage spaces for storing one of the plurality of storage product containers and (b) a conveying space adjacent to the storage module through which each of the spaces is accessible;
- a filling and withdrawal opening in a front wall of the storage rack module, the opening being in communication with the conveying space and configured to receive a storage product carrier therein at a position between the opposite side walls and vertically beneath one or more of the storage spaces in the storage module;
- the filling and withdrawal opening being accessible to an operator so that the operator can place storage products in the storage locations of the storage product carriers and remove the storage products from the storage product carriers when individual storage product carriers are located within the filling and withdrawal opening;
- a filling and withdrawal apparatus operatively coupled to the storage module to selectively move (a) a storage product carrier inserted in the opening through the conveying space in at least a vertical direction to any one of the storage locations and (b) a storage product carrier stored in any one of the storage locations through the conveying space to the opening for removal; and
- a plurality of lighting elements located inside the storage module, behind the front wall of the storage rack and between the opposite side walls of the storage module in a position proximate a top of the filling and withdrawal opening and vertically beneath one or more of the plurality of storage spaces in the storage module;
- the plurality of lighting elements being disposed in a two-dimensional grid inside the storage module, each of the plurality of lighting elements being selectively controlled for producing a light beam substantially vertically directed onto a different locally limited area on a surface of a storage product carrier disposed in the opening to create a light marking on the storage surface that distinguishes one or more of the storage locations on the surface of the storage product carrier from other storage locations on the surface of the storage product carrier.

8. The storage system of claim 7, wherein each of the lighting elements includes a cylindrical section for limiting a solid angle area of the light beam.

9. The storage system of claim 7, wherein each of the lighting elements is a light-emitting diode.

10. The storage system of claim 7, wherein each of the lighting elements includes a lens section.

11. The storage system of claim 7, wherein the light elements are arranged at a top side of the opening.

12. The storage system of claim 7, further comprising a control device controlling the discrete lighting elements to selectively illuminate fewer than all of the discrete lighting elements to selectively illuminate one or more of the different locally limited areas on the storage surface without similarly illuminating other different locally illuminated areas on the storage surface.

13. The storage system of claim 7, further comprising an operating unit coupled to a control device for requesting the storage product contained within one of the plurality of storage product carriers.

14. The storage system of claim 13, wherein the control device drives the filling and withdrawal apparatus to traverse the storage product carrier corresponding to the requested storage product into the opening.

15. A storage system comprising:
- a storage rack comprising a pair of spaced-apart storage modules defining therebetween a conveying space, each of the storage modules including a plurality of pairs of spaced supporting brackets on opposite side walls of the storage module, the pairs of spaced supporting brackets defining vertically displaced storage spaces for receiving tray-like storage product carriers each containing a plurality of storage locations for storing products, each storage space in each of the storage modules being accessible via the conveying space;
- a filling and withdrawal opening in a front wall of the storage rack disposed in one of the modules on a side of the module opposite a side facing the conveying space and through which each storage product carrier is inserted into and removed from the storage module, the filling and withdrawal opening configured to receive a storage product carrier between the opposite side walls and vertically beneath one or more of the storage spaces;
- the filling and withdrawal opening being accessible to an operator so that the operator can place storage products in the storage locations of the storage product carriers and remove the storage products from the storage product carriers when individual storage product carriers are located within the filling and withdrawal opening;
- an automatic filling and withdrawal apparatus disposed in the conveying space and configured to selectively convey (a) the storage product carriers inserted in the filling and withdrawal opening in at least a vertical direction to any one of the storage spaces and (b) a storage product carrier stored in any one of the storage spaces to the filling and withdrawal opening; and
- a plurality of discrete lighting elements located inside the storage module, behind the front wall of the storage rack and between the opposite side walls of the storage module in a position proximate a top of the filling and withdrawal opening and vertically beneath one or more of the plurality of storage spaces in the storage module;
- the plurality of discrete lighting elements being arranged in a two-dimensional grid, each of the discrete lighting elements being selectively controlled for generating a light beam that is essentially vertically directed from the respective lighting element onto a different locally limited area of a storage surface of a storage product carrier disposed in the filling and withdrawal opening to create a light marking on the storage surface that distinguishes one or more of the storage locations on the surface of the storage product carrier in the filling and withdrawal opening from other storage locations on the surface of the storage product carrier.

16. The system of claim 15 further comprising a control unit for controlling the plurality of discrete lighting units to selectively illuminate fewer than all of the plurality of discrete lighting elements to selectively illuminate one or more of the different locally limited areas on the storage surface without similarly illuminating other different locally illuminated areas on the storage surface.

17. The system of claim 16, wherein the control unit controls the plurality of discrete lighting units to selectively illuminate one of the plurality of storage locations of the storage product carrier in the filling and withdrawal opening.

18. The system of claim 15, wherein the storage spaces are accessible only through the conveying space.

19. The system of claim 15, wherein each storage space is free of independent lighting.

* * * * *